Dec. 31, 1968   A. H. ROBERTS   3,419,455
MOLDED DECORATIVE ARTICLE
Filed Jan. 28, 1966

INVENTOR
ARTHUR H. ROBERTS
BY
LASZLO AUER
AGENT.

United States Patent Office 3,419,455
Patented Dec. 31, 1968

3,419,455
MOLDED DECORATIVE ARTICLE
Arthur H. Roberts, Brooklyn, N.Y.
(12 Lynnwood Drive, Westbury, N.Y. 11590)
Continuation-in-part of applications Ser. No. 22,002, Apr. 13, 1960, Ser. No. 455,764, May 14, 1965, Ser. No. 475,989, July 30, 1965. This application Jan. 28, 1966, Ser. No. 523,778
15 Claims. (Cl. 161—7)

ABSTRACT OF THE DISCLOSURE

This invention relates to composite rigid decorative articles of manufacture and processes for their manufacture. The articles comprise a hollow outer shell component and an inner rigidifier component. The shell component is a premolded pliable plastic which has an access opening. The rigidifier component is a rigid cellular plastic positioned behind the inner walls of the shell component and is integrally formed therewith. Vinyl chloride in polymerized and plasticized state illustrates suitable materials for forming the shell component. Rigid polyurethane foams illustrate a suitable rigidifier component. In a favored embodiment the rigidifier component forms a second cavity. Such joint cavity may be reinforced by an ancillary reinforcing element, such as a flexible epoxy resin and a flexible polyester resin, among others. The wall thickness of the shell component ranges advantageously from about 15½ to about 250 mils. In the manufacturing process one of the favored embodiments is to foam in place in the hollow shell component in layers, thereby, in most cases, eliminating the need for reinforcing molds during the foaming step.

---

This application is a continuation-in-part of my copending patent applications Ser. No. 22,002, filed Apr. 13, 1960, now abandoned, for "Method and Means for Manufacturing Various Articles and Articles Produced Thereby," Ser. No. 455,764, filed May 14, 1965, for "Impact Resistant Article and Method of Manufacture" and Ser. No. 475,989, filed July 30, 1965, for "Molded Hollow Articles of Manufacture and Process for Their Preparation."

This invention relates to novel, rigid, impact resistant articles and to methods and means for their manufacture. The articles are of varying sizes, may have more or less intricate shapes and may have "undercuts." Similar articles in the prior art were made predominantly of ceramic or plaster materials. These prior art articles of manufacture have the disadvantage of being fragile and easily chipped. They require much hand finishing on the seam lines caused by the mold seams.

The prior art has also disclosed various casting processes for manufacturing seamless hollow articles out of plastisols and similar plastics materials. The resulting product is quite attractive and can be decorated as easily as plaster, and in fact more easily than ceramics. The plastisol articles so cast will not chip, however they are deformable. Also, if the die is seamless, a seamless product can be obtained. Plastisol has a defect called "creep" or "cold flow," which results in a warpage or distortion at somewhat higher than ambient temperatures as in the vicinity of household radiators and electric lamps. This property is generally characterized by the temperature at which distortion occurs.

Therefore, manufacturers of such prior art articles as lamp bases have had the choice of producing ceramic and plaster articles or the like which are resistant to heat but fragile, or producing plastisol articles which have good impact and chipping resistance at normal temperatures, but which are deformable, have "cold flow" and poor impact resistance at low temperatures. The phenomenon of "cold flow" has also been called "heat distortion."

An object of this invention is to provide manufactured articles with improved properties and without the disadvantages of the prior art articles.

A further object is to provide a process for producing small and large seamless objects of plastics with improved resistance to cold flow, chipping and breakage, and which is distinctly superior to prior art processes and the products produced thereby.

Other objects of this invention will become apparent from the description of this invention further below.

The articles of manufacture of my parent applications are rigid, three-dimensional and hollow. They comprise two components: (1) an outer layer component, also called the "shell" and (2) an inner layer component, also called the "flesh" or "rigidifier." In most of the cases varying parallel cross sections of a single article show varying dimensions and shapes or configurations, indicating curved sidewalls and undercuts. In other cases the cross sections may be identical, indicating box-shaped or cylindrical objects. In an alternative form of said parent applications the outer layer component and inner layer component jointly form a cavity and this cavity is then filled with a reinforcing spine, such as a rigid plastics foam material. The outer layer component is made of a flexible plastics material, illustrated by plastisol and polyethylene, whereas the inner layer component in the various parent applications is illustrated for instance by asphalt, plaster of paris and a composition comprising a filler which is bonded by the elastomer solids of a latex.

In contrast to the inventions of the parent applications the composite articles of manufacture of the instant invention comprise a hollow outer shell component and an inner rigidifier component. Further, the outer shell component is a premolded pliable plastics and has an access opening. The pliable or flexible nature of the premolded hollow outer shell component is characterized by the fact that, when free of the rigidifier component, it can be deformed, at least temporarily, by the application of hand pressure. In my parent applications the term "skin" was used to designate the shell component. The latter expression is preferred. The inner rigidifier component is a rigid cellular plastics. The rigidifier component is positioned within the space enclosed by the outer shell component and the former is in intimate contact with the entire inner surface of the latter. The rigid cellular plastics may also be called rigid plastics foams and may have either a closed cell or an open cell structure. The closed cell structure is preferred.

The composite articles of manufacture of the instant invention are rigid. In this context of the term "rigid" means a radical increase in rigidity when compared with the outer shell component itself and it also indicates utility for purposes requiring at least a certain degree of rigidity.

The rigid cellular plastics composition according to this invention acts as a rigidifier for the outer shell component. The premolded outer shell copmonent is hollow and the inner rigidifier component may fill the cavity formed by the hollow premolded shell component fully or in part. In the latter case the outer shell and inner rigidifier components jointly form a cavity and in such cases a reinforcing spine component may be present on the inner surface of the joint cavity. This will be discussed further below in greater detail.

The varying parallel cross-sections of a single composite article of manufacture of this invention may show varying shapes and dimensions, indicating curved sidewalls, angulated sidewalls and undercuts, or may show identical shapes and dimensions, indicating box-shaped or cylindrical objects.

The shell is preset in its shape by a molding or forming operation. It is formed from a plastics material, which is preferably pliable and resilient. Depending on the plastics material selected to form the shell, the molding operations may vary, in order to utilize the most advantageous method for the selected plastics. The outer surface of the shell readily receives coloring materials for decorating the composite article. In some cases, such as when the shell is of polyethylene, the outer surface may be pretreated prior to decoration. The inner walls of the shell define an internal cavity accessible through an opening in the shell. The inner rigidifier component is in intimate contact with the inner walls of the preset shell and is in supporting relationship to the outer shell. This inner component acts as a rigidifier and rigidly maintains the outer shell in its preset shape. The inner rigidifier is formed by a rigid plastics foam and is described in detail further below. The rigid foam composition is preferably applied in a liquid state and solidifies within the preset shell. In a preferred embodiment the shell component acts as a mold in which to form the inner rigidifier component. Depending on the properties of the shell and the rigid foam composition, the setting of the latter may be performed while the shell is in a second mold or die. This second mold or die would usually be a split mold and is used to prevent deformation of the shell during the casting and setting of the rigid foam composition forming the inner rigidifier component. The latter acts as a structural rigid backing member. The use of a second mold is superfluous in many cases.

The outer shell component of the composite article of manufacture of this invention has a preferred wall thickness of about 1/64 of an inch to about 1/4 of an inch. Expressed in thousandths of an inch, this corresponds to a range of from about 15.625 mils to about 250 mils. The lower figure may be rounded out to about 15½ mils. The inner rigidifier flesh component may have a wall thickness of that equal to the thickness of the shell, or even be as low as one half of the thickness of the shell, and in many cases the inner rigidifier fills the cavity formed by the outer layer in full. By varying the formulation of the rigid foam composition, a tougher or more rigid inner rigidifier would permit the use of a thinner layer than a less tough or less rigid inner rigidifier, while maintaining the composition of the shell constant. By changing the density of the rigid plastics foam it is possible to change its rigidifying action. A more dense rigid foam is more rigid than a less dense rigid foam, assuming that otherwise both have the same composition.

In one of the embodiments of this invention the outer shell and inner rigidifier jointly form a second cavity and a reinforcing spine may be applied as a third component in the entirety or in part of the second cavity. Such a spine assists the rigidifying action of the inner layer and toughens the composite article of manufacture. In this application the expression "ancillary reinforcing element" is preferred to the expression "spline."

As stated above, the cellular plastics of this invention may be of open cell or closed cell structure. Most rigid foams are closed cell structures. Open cell rigid foam structures can be prepared from urea-formaldehyde and phenol-formaldehyde foaming compositions. Rigid polyurethane foams with open cell structures can be prepared by the use of special silicone surfactants as additives, designed for this particular purpose.

When considering the improvement which the composite articles of manufacture of this invention show, versus either the properties of the shell component or of the rigidifier component, utility for many purposes becomes apparent. In case of a lamp base resistance to deformation is achieved. Such deformation may be caused by compressive forces resulting from the assembly of the lamp. The resistance to impact also increases. The thermal deformation is also decreased. The latter effect is important in manufacturing planters. These have to withstand warm climate and subtropical or tropical temperatures without deformation. In preparing wash basins the resistance to hot and cold water is improved and achieved. The rigidifier may contribute thermal insulation in addition to rigidifying the end product. While preventing the buckling and deformation of the shell component the impact resistance and resistance to chipping of the rigidifier component are also improved. These properties indicate utility for a great many composite articles of manufacture. All the shell components used herein have an access opening. In most cases the surface area of the access opening, when compared with the total external surface area of the shell, is small. In other cases it may be larger. For many products prepared according to this invention the surface area of the access opening does not exceed one sixth of the total external surface area of the shell component. As an illustration it may be mentioned that a hollow cube having one side open as access opening has an access surface area of one sixth of the total surface area of the cube.

The outer shell component

Plastisols illustrate an eminently suitable material to form the shell portion of the articles of manufacture of this invention. Plastisols are well described in the literature, as e.g. in Modern Plastics 26, 78 (April 1949) by Perrone and Neuwirth. They are dispersions of finely divided polyvinyl resin powders in liquid organic plasticizers. The resins contain predominantly polyvinyl chloride with or without some other polymerized monomer. They are polymerized to a degree where they have very low solubility at room temperature. Therefore, instead of dissolving them, the plastisols contain the resins in a dispersed state; the dispersions are usually of creamy consistency at room temperature and are always fluid to a certain degree. A great variety of plasticizers can be used. Dioctyl phthalate is an example. Dioctyl adipate is another example, which frequently is used in admixture with dioctyl phthalate. Polyester plasticizers are also well known. The plastisols usually contain a stabilizer and may contain pigment, if so desired. For convenience and to achieve brevity, a few publications may be referred to, which all deal with plastisols, their formulation and application methods: (a) Geon Resin 121 in Plastisol Compounding, Service Bulletin PR-4, revised October 1958, B. F. Goodrich Chemical Company, 24 pages. (b) The Vanderbilt News, vol. 26, No. 3, June 1960, R. T. Vanderbilt Company, Inc., page 12. (c) Modern Plastics Encyclopedia Issue for 1961, published in September 1960, Vinyl polymers and copolymers, pages 129 to 132. Plastisol Molding, pages 765 to 771. (d) Modern Plastics Encyclopedia 1965 (issued 1964). Vinyl Polymers and Copolymers, page 271. Plastisol Molding, page 690.

Recently a reactive vinyl plastisol system was introduced on the market. This consists of a mixture of a vinyl dispersion resin and a reactive monomer. The former is dispersed in the latter. When heat is applied to this system, also used to cause gelation and fusion, the reactive monomer polymerizes and produces a more rigid product than previously produced with conventional plastisols. Reactive acrylic monomers illustrate examples of such reactive monomers.

When molding plastisols, the material is heated to a gelling temperature and a gelled film or layer is formed which is very weak and cheesy, but which does not flow. Further heating is required to "fuse" the deposit, causing the resin to dissolve in the plasticizer and form a tough homogeneous resinous mass in which the powdered resin and liquid plasticizer have formed a single uniform phase. The fusion transforms the cheesy deposit or film to a tough leather-like homogeneous shell.

With regard to temperatures required, these are well known in the art. They vary from composition to composition. They vary with time. There are, further, three types of temperatures involved: (1) oven temperature, (2) mold (die) temperature and (3) temperature of the plastisol. Gelation temperature may be accomplished by heating the oven from 150 to 600° F. and usually is between a plastisol temperature of 150 to 300° F. The necessary times vary with the temperature used. Fusion is accomplished by heating the gelled layer in ovens from about 350° F. to about 650° F. The achieved plastisol temperature for fusion should advantageously range from about 350° to 450° F. The gelation temperature and fusion temperature depend on the formulation of the plastisols. Therefore some divergence from the above temperature ranges may occur if special formulations are prepared.

The most useful molding methods for plastisol shells are illustrated by (a) slush molding, also called slush casting and (b) rotational molding, also called rotational casting. The expression "casting" is used because the plastisols are applied in fluid state and for this reason the operation has similarity to metallurgical casting. Seamless dies are preferred for the intermediate products of this invention. They can be readily utilized, even when complicated undercuts exist in the dies, as the shells produced from the plastisols are flexible, elastic and have a "shape memory," i.e., they recover from their stretched position, obtained during removal, to the original molded shape.

When slush molding or slush casting is used, in the first step an excess of plastisol may be poured into the seamless die. As the plastisol reaches gelation temperature, the layer adjacent to the metal wall of the mold gels, i.e., solidifies. The thickness of the gelled wall is determined by the duration of time the mold is exposed to the temperature of gelation. The excess plastisol is then removed by pouring off the liquid portion. Heating is then continued to complete the fusion and the molded shell is then removed or stripped from the mold. There are two methods known in slush molding: (i) One Pour Method, and (ii) Two Pour Method. Both are well known in the art and are applicable to make the shells of this invention from plastisols.

The rotational molding is another method of casting. The basic departure from the slush molding is that, instead of an excess of the liquid plastisol, a premeasured quantity of the fluid is used when charging the mold. This eliminates the need for removing any excess. As the mold containing the charged fluid plastisol is rotated on the rotational molding machine and the mold is heated, gelation of the plastisol occurs uniformly on the inner surface of the heated mold. By continuing the heating and/or increasing the temperature of the mold, the gelled plastisol fuses. The fusion completes the molding of the shell and the completed shell is then stripped and removed from the mold.

Whereas the casting by slush molding or rotational molding is preferred to form the shell from plastisols, other methods known in the art may also be followed to achieve the same purpose.

Objects made of plastisols frequently display the defect known as cold flow. Cold flow may be defined as the warpage or flow of material caused by its normal environmental temperature. Cold flow in plastics is analogous to the warping of a wax candle in a hot climate, and when a thermoplastic product is subjected to compression, tension or flexing, the cold flow characteristics become even more accentuated. When a condition of localized intensified heat, such as that to which lamp bases are often subjected, is imposed upon a stressed article, cold flow warpage becomes critical and often results in making further use of the article impossible. The application of a rigidifier in accordance with the present invention counteracts the cold flow characteristics of plastisol shells, or at least reduces them to commercially acceptable limits.

Considering the aim of this invention of producing rigid articles the flexible nature of the plastisol shells is a drawback. The application of the rigidifier component rectifies this defect.

Polyolefins, such as polyethylene and polypropylene are other illustrative examples for the production of the shell portion of this invention. Polyethylene is made today of varying properties with the low pressure and high pressure polymerization processes. It is supplied with varying densities, molecular weights, flexibility and other characteristics. The types of polyethylene most suitable for this invention are pliable, flexible and show some degree of elasticity. Polyethylene is preferred in this invention over polypropylene since it is more easily formed into pliable and flexible shells. Polyethylene copolymers, such as ethylene-vinyl acetate and ethylene-ethyl acrylate copolymers, offer improved flexibility and resilience. They are rubber-like and similar to elastomeric plastics. For the production of shells from polyethylene and polypropylene seamless dies are not satisfactory and two-piece dies are preferred, using blow molding or other methods. Polyallomers belong to this class of materials, as they are copolymers of ethylene and propylene.

The shell portion of the articles of manufacture of this invention may be formed of other materials such as vulcanized natural rubber or synthetic rubber. The shells may be formed according to known procedures of rubber technology. One of the methods useful in preparing shells from rubber is to use latex molding (latex casting) compounds, utilizing plaster of paris molds. The Vanderbilt News, vol. 27, No. 4, December 1961, page 72, deals with latex compounding which can be used to make shells for articles according to the present invention.

Other suitable plastics materials, which can form the outer layer shells of this invention are illustrated by methyl methacrylate polymer, ethyl cellulose, polycarbonates, polyurethane elastomers, flexible epoxy compounds, flexible polyesters, amongst others. Some illustrative examples are given below:

Example A.—Methyl methacrylate

All percentages in this example and in this specification are weight percentages. A mixture was prepared of 62.5% methyl methacrylate monomer, 0.6% benzoyl peroxide, 2.1% white color paste concentrate, compatible with methyl methacrylate, 34.3% polymethylmethacrylate, DuPont's Lucite "30," 0.5% dimethyl-p-toluidine, totaling 100%. The shells were prepared by casting into suitable molds. The composition of this example polymerizes at room temperature. Heating to 100–120° F. accelerates polymerization considerably. Latex molds can be used. Plaster and clay molds may also be used, if coated with gelatin, cellulose acetate, sodium silicate or tin foil. Casting was carried out in a latex mold in 3 subsequent coats and yielded a molded shell with acceptable flexibility and adequate mold surface reproduction. Plasticizers may be incorporated, if desired. Harflex 340 of Harchem Division, Wallace & Tiernan, Inc. is a suitable resinous-type, primary, non-migrating, saturated polyester plasticizer, compatible with methyl methacrylate monomer. The color paste was used to stain the shell. Its use is optional.

Example B.—Polycarbonate

Polycarbonates can be cast from organic solvent solutions. Polycarbonates dissolve, with ease e.g. in methylene chloride. A solution was prepared from Lexan No. 105 (General Electric Co.) powder to form a solution of 83.3% polycarbonate in 16.7% methylene chloride, yielding 100% of the solution. As an example, this solution can be slush cast in latex molds, and air can be blown in to assist in volatilizing the solvent. The latex molds are standard in casting plaster of paris objects. The polycarbonate shell remains in the mold. It is very strong, flexible and durable, and can easily be stripped from the mold. To reduce the effect of shrinkage, fillers may be incorporated. A ratio of equal weights of filler to polycarbonate is an illustrative example. The resulting shell is still strong. Polycarbonate resins are marketed by General Electric under the Trade Name of Lexan. Polycarbonates can be described as polymeric combinations of bi-functional phenols or bisphenols, linked together through a carbonate linkage. They can also be blow molded and vacuum formed.

Example C.—Flexible epoxy resin

The proper composition has at least three ingredients. (1) a low molecular weight epoxy resin of the epichlorhydrin-bisphenol A—condensation product type, like Shell Chemical's Epon 828. (Epon is a registered trademark of Shell); (2) low viscosity liquid aliphatic polyepoxides, like Epon Resin 871, which imparts increased flexibility to Epon resin compositions; and (3) a curing agent, illustrated by diethylenetriamine and triethylenetetramine, respectively known as DTA and TETA. Other comparative items, known in the trade, may be replaced for the commercial products mentioned. Fillers may be present as additional ingredients. A suitable additive to regulate viscosity is a submicroscopic pyrogenic silica prepared in a hot gaseous environment, marketed by Cabot Corporation under the tradename of Cab-O-Sil. A satisfactory composition to obtain shells is 44.25% Epon Resin 828, 44.25% Epon Resin 871, 2.65% of Cab-O-Sil and 8.85% diethylenetriamine, totaling 100%. This composition sets at room temperature in about 5 hours and at 80° C. it sets in 2 hours. The composition may be varied according to principles known in the art. Shells can be molded in latex molds or other elastomer molds. These are actually multi-pieced plaster of Paris molds externally reinforming an entirely separate second flexible elastomer mold, having one opening for pouring in the composition to be molded and set. The rubber surface is coated with a parting agent and the epoxy composition is slush cast into the molds. The slit mold here described is used to mold shells showing undercuts. Other molds and molding methods can also be used, depending on the article to be manufactured. Epoxy plasticizers include epoxy compounds of fatty oils and their acids. Epoxy novolac resins and cycloaliphatic epoxies are other illustrative members of this group. Polyamids and acid anhydrides may also be used as curing agents.

Example D.—Flexible polyesters

Polyester resins are usually made in two steps. In the first step a condensation reaction is carried out between a dibasic acid and a diol and this is then blended with a monomer. Maleic anhydride and fumaric acid are examples of the dibasic acids. Other unsaturated acids could be used, like itaconic. Phthalic anhydride and isophthalic acid may be part components of the acids, to secure desired modifications. The useful glycols form a long list known in the art. Propylene glycol, ethylene glycol, diethylene glycol and dipropylene glycol are illustrative examples, Neopentyl glycol is another example. Styrene is most frequently used as the crosslinking monomer. Vinyl toluene is another example. Laminac Polyester Resin EPX–126–3 is a flexible polyester resin containing styrene monomer. Laminac is a registered trademark of American Cyanamid. A composition was prepared from Laminac Polyester Resin EPX–126–3 92.6%, MEK peroxide 2.7%, Cobalt Naphthenate solution (6% Co) 0.27%, Laminac Additive #10 1.73% and Cab-O-Sil 2.7%, totaling 100%. MEK peroxide is methylethyl ketone peroxide. Laminac Additive #10 is a petroleum wax composition dispersed in styrene, for ease of incorporation into polyesters. It improves surface characteristics. The peroxide is the crosslinking agent and the cobalt assists the crosslinking. Flexible polyesters usually contain long chain acids or glycols. The gel time at room temperature is about 10 minutes for this composition. The Cab-O-Sil assists in regulating the thickness of the deposit if slush casting is used for molding. Two or three coats can be slushed to obtain a desired shell thickness. The shell formation occurs at room temperature. More rigid polyesters can be blended with the flexible one used in this example, to vary properties. Latex molds and those utilized for epoxy resins, may be used with polyesters.

Example E.—Isocyanate elastomers (urethane elastomers)

Liquid urethane polymers, such as Du Pont's Adiprene L–100, can be transformed into tough, rubbery solids by reaction of the isocyanate group with polyamine or polyol compounds. In addition, some materials which do not contain active hydrogens, such as the titanate esters, appear to catalyze cross-linking. Adiprene L–100 can be cured with diamines, or moisture (water), or polyols, or by catalysts, such as lead or cobalt naphthenate, potassimum acetate and titanate esters. Tetrabutyltitanate is an example of the esters. One of the popular polyamines is MOCA, which is 4,4'-methylene-bis-(2-chloroaniline). A formulation is illustrated by 100 parts of Adiprene L–100 and 12.5 parts of MOCA, which gives a MOCA percent equivalent of 95. Parts are by weight. Conditions were: Mixing temperature: 212° F., cure temperature: 212° F., curing time: 3 hours. LD–420 is a different type of liquid urethane elastomer, which yields high quality vulcanizates when cured with MOCA. A respective formulation is illustrated by 100 weight parts of LD–420 (Du Pont) and 8.8 weight parts of MOCA. This is mixed and cured the same way as Adiprene L–100, for the same length of time. It is improved by after curing 1 week at 75° F. at 60% relative humidity. In making a shell rotational molding is recommended both for Adiprene L–100 and for LD–420. A silicone mold release is advantageously used to assist separation from the molds.

Example F.—Ethyl cellulose

Ethyl cellulose shells can be molded by vacuum forming and injection molding, amongst other methods. The same applies to cellulose acetate and cellulose acetobutyrate. Combination of casting and hot melt methods may also be used.

The present molded outer shell components can be prepared by various molding processes. The selected process depends on the selected plastic material and on the shape and size of the shell to be molded. For illustrative purposes a few examples are given. Casting such as slush casting or rotational casting: plastisol, flexible polyester, flexible epoxy resins, methyl methacrylate, polycarbonates from solution, rubber from latex, etc. Injection molding or extrusion: plastisol, polycarbonates, ethyl cellulose, polyethylene, cellulose acetate, cellulose acetobutyrate, etc. Vacuum forming: polyethylene, polycarbonates, polyallomers, etc. Blow molding: polycarbonates, polyethylene, polyallomers, ethyl cellulose, cellulose acetate, etc. Hot melt process: ethyl cellulose, plastisol or other plasticized polyvinyl chloride composition, polyethylene, etc.

Whether a one-piece, two-piece or multi-piece mold is required, depends on the selected shell material and, to some extent on the shape of the manufactured article. The molding process also influences the mold selection. Plastisol illustrates a shell forming material which permits the use of one-piece molds even if the shell has many undercuts in its shape.

Methyl methacrylate illustrates a material which requires at least two-piece molds in many instances. Below molding and vacuum forming are usually carried out in two-piece or multi-piece molds. One-piece molds form seamless molded shapes. Two-piece molds cause, in most cases, some seam formation. It may be necessary to eliminate these seams. Therefore, seamless molding is of advantage.

The expression that the shell materials are flexible, pliable and resilient is meant in a relative manner in comparison with the inner rigidifier component of the articles of manufacture, i.e. the flesh portions which are relatively rigid. The composite article itself is rigid and resists indentation, chipping, etc. The flesh portion rigidifies the flexible shells and improves resistance to cold flow or heat distortion. The shell materials protect the rigidifier flesh portion from fracture and improve their resistance to impact. This mutual improving effect between shell and flesh materials is unexpected and surprising and the effect obtained could be described as synergistic.

From the shell materials discussed above, polyethylene and polycarbonates, when blow molded, are used at a limited thickness. In using the various shell materials with the rigid foam inner rigidifier component of this invention, the composite article manufactured shows elimination of flexibility, improved resistance to impact and in many cases the tensile strength of the composite article shows improvement when compared separately with that of the shell or flesh material. These observations apply to shells made of plastisols, flexible polyesters, flexible epoxy resins, polyethylene, polypropylene, polyallomers, polyurethane elastomers, rubber, polycarbonate, ethyl cellulose, methyl methacrylate, amongst others. The degree of the above discussed improvements may vary according to the selection of the shell forming material, its secondary compounding ingredients, thickness and shape of the shell, formulation of the flesh material and its thickness, amongst other factors.

According to a more recent type of molding method shells can be molded by rotational casting of powders. Polyethylene in powder form illustrates suitability for this method. The powder is rotated to obtain uniform distribution over the interior surface of the mold. The mold is then heated to obtain the required molding temperature.

For the purpose of forming the outer shell component the thermoplastic plastics materials are preferred. These are illustrated by plastisols and polyethylene. For the purpose to form the inner rigidifier component the thermosetting rigid foams are preferred. The reactive vinyl plastisol systems containing reactive acrylic monomers, discussed further above, are considered as thermoplastic for the purposes of this invention and are included in the preferred group of plastics for the purpose of forming the outer shell component.

THE INNER RIGIDIFIER COMPONENT

As described earlier, the flesh portion of the products of this invention is the inner rigidifier component which in turn is snugly attached to the outer shell component and is in intimate contact therewith. The inner rigidifier component comprises a rigid foam. One of the purposes of the application of the inner rigidifier component is to rigidify the outer shell component. The rigidifying action is of particular importance, where the outer shell component is flexible, according to a favored embodiment of this invention. A further object of the inner rigidifier component is to reinforce the outer shell component and in many cases to provide "body" and structural stability to the composite article of manufacture.

Rigid plastics foams are well known in the art and are discussed e.g. by T. H. Ferrigno in "Rigid Plastics Foams," Reinhold Publishing Corp., 1963. They are illustrated by rigid polyurethane foams, polystyrene foams, epoxy foams, polyvinyl chloride foams, phenolic resin foams, silicone foams, syntactic foams, cellulose acetate foams, acrylic foams, polyester foams, asphalt foams, amongst others. These rigid plastic foams are not equally suitable for the instant invention. For this reason they will be discussed individually. The favored foam systems are illustrated by the rigid polyurethane foams. They will be discussed at some length.

(1) Rigid polyurethane foams

Diisocyanate based polyurethane foams are described amongst others in "German Plastics Practice" by De Bell et al., 1946, pp. 310, 316 and 455 to 465. Some of the problems encountered in this field of the art are discussed by H. L. Heiss et al., Ind. Eng. Chem., 1954, pages 1498 to 1503.

In the preparation of polyurethane foams several components are used. Some of the components permit the use of alternatives. One of the necessary components is a compound containing free isocyanate (—NCO) radicals. This component can be a polyisocyanate, usually a diisocyanate, or a reaction product thereof, containing free —NCO radicals. Such reaction product is sometimes called an adduct or a prepolymer or a quasi-prepolymer, and is usually formed with a polyol. The second necessary component supplies active hydrogen atoms, supplied by free hydroxyl groups derived from a polyol or from a hydroxyl-terminated polyester. The free hydroxyl groups are reactive. Alternatively polyesters or compounds containing reactive amine or COOH groups can supply the active hydrogen contributing second component. When free hydroxyl groups or free carboxyl groups are reacted with free isocyanate radicals, $CO_2$ gas is formed in situ in the reaction which in turn acts as the foam forming gas. These types of foam are also known as carbon dioxide blown foams. In many cases small quantities of water are also added to the reaction mixture in order to react with the free —NCO groups, forming again $CO_2$ in situ. Ureas are frequently formed as intermediates, which react in turn with additional free —NCO groups to yield urethanes or cause crosslinking of the polymers formed in the reaction. In many formulations catalysts are also present and optionally auxiliary foamers or blowing agents may be added, like trichlorofluoromethane.

Aryl diisocyanates are preferred, but alkyl diisocyanates may also be used. The most popular diisocyanates are the toluene diisocyanates, also called tolylene diisocyanates. 2,4 tolylene diisocyanate and 2,6 tolylene diisocyanate are frequently used in admixture with each other and commercially available products include mixtures of these two isomers in proportions of 60%–40%, 65%–35%, 80%–20%. The 2,4 tolylene diisocyanate is also produced in 99%–100% purity, and is also called TDI. The 80/20 and 65/35 mixtures are called TDI-Mixture, with the respective percentage identification added. Other diisocyanates are 3,3'-bitolylene 4,4'-diisocyanate (TODI); diphenylmethane 4,4'-diisocyanate (MDI); (p,p'-diphenylmethane diisocyanate); polymethylene polyphenylisocyanate (PAPI, essentially a trifunctional polyisocyanate); 1-chlorophenyl-2,4-diisocyanate; diphenyl-4-6-4'-triisocyanate; 1,6-hexamethylene-diisocyanate; p-dixylyl methane-4,4'-diisocyanate, di-(p-isocyanylcyclohexyl) methane; tri-(p-isocyanylphenyl)-methane.

The principal commercially available polyhydroxy compounds are ethylene oxide and propylene oxide adducts of polyfunctional active hydrogen compounds such as glycerine, sorbitol, trimethylolpropane, ethylene diamine, sucrose, etc. These compounds are polyethers, but since they are primarily polyols, the term polyether polyol is properly used. Rigid foams require the use of highly functional reactants. These are most useful when based upon polyalcohols having functionalities of at least 3 and in many cases greater than 3. The fluidity of these reactants at ambient temperatures is important as most of the time the reaction is carried out at room temperature and in absence of diluents. Atlas Chemical Industries offers propylene oxide condensates of sorbitol. Union Carbide Chemicals Co. offers amongst others, diethylene triamine-alkylene oxide condensates, triols, hexols, pentols and other polyols. Wyandotte Chemical Corp. markets a variety of polyether polyols, which are propylene oxide or ethylene oxide derivatives based on trimethylolpropane or on glycerol, or on pentaerythritol, or on sorbitol. In one type of polyether polyols marketed by Dow Chemical Co., sucrose is reacted with propylene oxide, yielding cyclic polyfunctional polyether polyols.

Olin-Mathieson Chemical Corp. offers O,O'-bis(diethanolaminomethyl) - p - nonylphenol. 1,2,6-hexane triol is another example of usable polyols.

Various hydroxyl, carboxyl and amide bearing compounds may be reacted with polyisocyanates to form rigid foams. Pittsburgh Plate Glass Company markets Selectrofoam Resin 6002, which is a high viscosity saturated polyester resin, compatible with toluene diisocyanate. In spite of its high viscosity, it exhibits fair mixing properties in batch-type processes. It has a hydroxyl number of 440. Products have been prepared primarily for flame-proofing purposes which can replace part of the polyether polyol in the reaction. They are propylene oxide condensation products of aryl or alkyl phosphonates, like di-polyoxypropylene phenylphosphonate and di-polyoxypropylene chloromethylphosphonate. An alkyd, containing free carboxyl groups and reactive with diisocyanates, was prepared in Germany according to DeBell, from 2½ mols of adipic acid, ½ mol phthalic anhydride and 4 mols of trimethylolpropane, having an acid number of 35 and containing residual water.

As the handling of diisocyanates requires special and skilled care and precautionary measures it became useful to pre-react the diisocyanates prior to foaming and to complete the reaction in a subsequent step. When polyesters and less effective catalysts are used in the reaction, it is advantageous to prepare prepolymers. In this case the polymerization reaction is partially completed prior to foaming, and therefore less heat of reaction is generated during the foaming step than in the one-shot method. This is advantageous in high density foam preparation, like 6 p.c.f. (pounds per cubic foot) or higher. In preparing the prepolymer a polyester of known hydroxyl number is charged into a jacketed, agitator-equipped, glass lined or stainless steel reaction kettle which has been flushed free of moisture by dry air or dry nitrogen. The following is an illustration of proportion:

(1) 91.7 parts by wt. of TDI with combining weight of 87.4 (5% excess), (2) 87.5 parts by weight of polyester with a combined hydroxyl number and acid number of 450 and having a combining weight of 125, and (3) 2.7 weight parts of water, having a combining weight of 9. The reactants are mixed at room temperature, the exothermic reaction is permitted to decline and the batch is held at about 100° C. for approximately one hour. It is advantageous to keep the water out from the initial reaction and to prevent entry of airborne moisture. The water is added prior to foaming in combination with the catalyst-emulsifier mixture. Excess free isocyanate (—NCO) content is usually about 5%, but depends on the amount of water to be used in the foaming reaction. The prepolymers overcome the handling of noxious diisocyanate in the foam producing plants. They are, however, very viscous, present problems in pumping and require small proportions of addition of catalyst-emulsifier mixture, such as a ratio of 2 to 100 parts of prepolymer. This makes the metering difficult.

The introduction of quasi-prepolymers or partial prepolymers represents an advantageous progress in rigid foam technology. They are preferred for the instant invention. They are particularly advantageous with thermoplastic shell components. The quasi-prepolymers are usually prepared by reacting of about 4 to 4.5 equivalent weights of diisocyanate with 1 equivalent weight of polyether polyol. When using TDI, it is customary to mix all of the diisocyanate with one half of the polyol earmarked for the reaction and to allow the exothermic reaction to subside and then add the remainder of the polyether polyol. The batch is then adjusted to a temperature of 70° C. and maintained at that temperature for an hour. Moderate agitation is used during the reaction and dry inert atmosphere is provided. The viscosity of the quasi-prepolymers ranges, in most cases, between about 4000 and about 7500 cps., with a tolerance of 1000 cps. ± for a given grade. If excess TDI is added, the addition may bring the viscosities down to 100 cps. or less. The quasi-prepolymer is reacted with the proper quantity of additional polyether polyol just prior to the foaming operation. The advantages of using quasi-prepolymers are numerous. Some of these are as follows: good storage stability of the ultimate reactants; reduction of the exothermic reaction; reduction of the noxious property of TDI and the ability to produce uniform foams with primitive mixing equipment.

Quasi-prepolymers may be formulated into delayed action one-part systems by partial blocking of the prepolymer with tertiary-butyl alcohol. Boric acid, surfactant and catalyst are added. Such blocked compositions are stable at room temperature and produce rigid foams when heated to elevated temperatures, such as 150° C.

The rigid foam forming compositions may contain other ingredients in addition to the diisocyanate component and the component reactive therewith. Catalysts, surface-active agents and additional blowing agents are illustrative of such other additives.

The catalysts promote the reaction, shorten reaction time and channel the reaction towards the proper and desired end product. Examples of N-containing catalysts are N-methylmorpholine, N-ethylmorpholine, triethylenediamine, diethylethanolamine, dimethylethanolamine, triethylamine and N,N,N',N'-tetramethyl-1,3-butanediamine. The amines are active at pH ranges of 10 and higher. Metallic catalysts are illustrated by stannous chloride, stannous octoate, ferric acetylacetonate, tri-n-butyltin acetonate, bis(2-ethylhexyl)tin oxide, di-n-butyltin diacetate, di-n-butyltin dilaurate, dimethyltin dichloride. Synergistic effects are obtained by using certain organotin compounds with tertiary amines. For instance the mixture of 1 mol-percent triethylamine combined with 0.001 mol-percent of di-n-butyltin diacetate have a greater relative activity than either one alone, used in the same molpercent ratio. In general it may be stated, that rigid foams require lower concentrations of catalysts than do flexible foams.

When water is added to polyester prepolymers to provide carbon dioxide blowing, difficulties are encountered, as water is not readily dispersible in such systems. Various nonionic and anionic surface-active agents are found effective to act as emulsifying and wetting agents. With polyether polyols the viscosities are lower, still surface-active agents are useful to provide uniform foam cell structure in rigid foams. The preferred surface-active agents nowadays are organo-silicone fluids. They are organo-silicon block copolymers. Dimethyl-silicone oil is one designation. These silicone compounds are soluble in water, polyisocyanates, quasi-prepolymers, trichlorofluoromethane and amines, and are dispersible in polyether polyols and organo-tin catalysts. "Dow Corning 113" is a silicone-glycol copolymer, specifically developed for rigid polyurethane foams. General Electric's SF-1034 and XF-1066 are copolymers of dimethyl polysiloxane and polyalkylene ether. They have surface-active properties. Silicone surfactants are usually used in proportions of 0.5% to 1% of the total weight of the foam ingredients. In some cases the proportion may be lowered to 0.25%. The silicones promote bubble formation, equalize surface tension on the surface of the bubble, impart resilience to the film and promote resistance to collapse when distorted during the rising of the foam.

Halocarbons are used as additional blowing agents. The same types can be used as in refrigeration: $CCl_3F$, $CCl_2F_2$ and $CCl_2F-CClF_2$. For the purposes of this invention trichlorofluoromethane is most advantageous, as its boiling point and evaporation characteristics are the most suitable for working close to room temperature. Advantageously halocarbons have low thermal conductivity and this increases with temperature rise to a lesser degree than it does with $CO_2$ or air. They have a high degree of hydrolytic stability and do not dissolve water. By their lack of hygroscopicity they reduce the susceptibility of prepolymers or quasi-prepolymers to air-borne moisture. $CO_2$-blown foams cannot be produced reliably at low densities. Their practical lower limit is about 4 p.c.f. (lb./cu. ft.). For economic reasons the preferred foam densities in this invention are about 1½ to 3 p.c.f. These can be formed with good uniformity by using halocarbon blowing agents.

Flame retardants are another group of additives. Whereas phosphonium compounds with reactive OH groups are available to replace part of the polyether polyol reactant component, the trade frequently uses plasticizer type additives which are non-reactive with —NCO groups, to obtain flame retardant properties. Examples are: tris-(2,3-dibromopropyl)phosphate and tris-(chloroethyl)phosphate.

For various specific effects other additives may also be present, such as cellulose derivatives to control bubble formation, and comminuted minerals to assist in reducing shrinkage after foam formation. Hydrous aluminum silicates and kaolinite illustrate the latter group.

Manufacturing methods and problems related to the instant invention will be discussed further below. These will be illustrated by rigid polyurethane foams. At this point it is logical to discuss other suitable rigid plastic foams. Before doing so, a few facts have to be pointed out, to explain the difference in degree of applicability of these rigid foams to the instant invention.

The shell component of the herein claimed article of manufacture is molded of a pliable plastics. The pliable plastics are in many cases thermoplastic and may require a mold not only in the step preparing the shell component but also in the foaming step, should elevated temperatures be needed either for the foaming step or for the after-curing of the rigid foam. The use of a mold during the foaming step is required to prevent deformation of the molded skin, providing the shell is thermoplastic and the foaming step requires elevated temperatures. The use of molds during the foaming step presents several problems. As the foam solidifies, the mold has to be at least a two-piece mold in order to permit removal of the article of manufacture. If undercuts are present in the article of manufacture, a multi-piece mold is required or the mold has to be disposable and removable by e.g. fracturing. Such multi-piece molds are expensive. The molds, if permanent, are tied up for long periods and prevent mass production techniques. The "foam-in-place" method of foam production is the most advantageous for this invention. From these considerations it follows, that if foam production can be carried out in the absence of molds and the molded skins themselves can be used alone for the foam-in-place method, great advantages are derived in producing the articles of manufacture of this invention. It also follows that the type of foam where higher temperatures are required and expensive molds are involved is less attractive for this invention.

(2) Polystyrene rigid foams

Polystyrene is readily available. Its rigid foams are less adaptable to the preferred mass production techniques of this invention than polyurethane foams. Polystyrene foams cannot be applied with ease with the foam-in-place method. They require the application of heat. This places limitations on their use. Smaller batch mixing operations can not be carried out with them either.

The extrusion technique is one method to prepare rigid polystyrene foams. It injects a volatile liquid, like methyl chloride into the polymer melt and the melt expands upon release of pressure and cools rapidly. This method produces a low density product. It is more adaptable to producing slabs which then can be placed mechanically into the shells and attached thereto by the aid of adhesives.

In another method styrene is polymerized, containing the foaming agent, in an aqueous emulsion and beads or rounded granules are produced. The beads so formed are filtered and washed. Hydrocarbon blowing agents can be used, such as pentane, hexane or heptane. The blowing agent should boil below or at the softening point of the polymer. This can be illustrated by the temperature of 175° F. Diethyl ether and ethanol mixture is also used, by first preparing the granules and then soaking them in the solvent. Petroleum ether yields less than 1 p.c.f. foams using 6–8% of the blowing agent. Alkyl phenol polyoxyethylene condensation products or oil soluble higher alcohols ($C_8$ to $C_{22}$) are used for specific purposes. This type is called "expandable" polystyrene. Pre-expansion or prefoaming is advisable if low density foams are to be produced. One of the molding methods is the steam chest method. For the purposes of this invention one can expand polystyrene beads inside the molded shell and adjacent thereto. The shell component is placed in a suitable mold, the polystyrene beads are placed into the shell and heat is applied to accomplish the expansion. An adhesive layer may be advantageously used in between the shell component and the foam to secure proper shrinkage relationship between the two components.

Injection molding can be carried out with expandable polystyrene containing a halocarbon blowing agent. This is not too applicable to the instant invention. Blow molding, beginning with an extrusion operation is also a method. 0.2% citric acid monohydrate and 0.25% sodium bicarbonate is used as microcell generating additives.

When a prefabricated foamed object is bonded to molded shells, drying, setting or hot melt adhesives may be used to accomplish the bonding.

(3) Rigid epoxy foams

The commercially available epoxy resins are condensation products of epichlorhydrin and Bisphenol A. They are polymerized to different molecular weights and range from liquids to hard fragile solids. Epon 828 illustrates a commercial product useful in preparation of rigid foams from liquid compositions. It has a viscosity of 50 to 150 poises at 25° C. and an epoxide equivalent of 175 to 210. Typical examples of highly reactive curing agents are diethylene triamine and triethylene tetramine. For specific purposes other curing agents may be used, such as aromatic polyamines, ethoxylated and cyanoethylated amines, tertiary amines, cyclic amines, acid anhydrides and amine terminated polyamides, amongst others. Difunctional curing agents would be expected to yield linear polymers with the difunctional epoxy resins. However, tertiary amines promote crosslinking between polyfunctional amines and epoxy resins. The presence of hydroxyl groups accelerates the reaction. High density foams can be based on Epon 828 and prepared by using nitrogen releasing organic compounds as blowing agents, an emulsifier, a solvent to reduce the exothermic reaction temperature and a polyamine curing agent. The resin has to be preheated to about 110° C. and this imposes limitation on its use. In low density foams halocarbon blowing agents are used. Silicone surface active agents assist in simplifying and extending the use of epoxy foams. Halocarbon 11 (fluorotrichloromethane, also called trichlorofluoromethane) yields 2 p.c.f. foams with ease.

Foam-in-place systems are available from various suppliers. They are marketed as proprietary products. They are supplied as resin and curing agent. The resin component must be kept at 65° F. prior to mixing to prevent loss of the halocarbon blowing agent. Initiation time for start of foam rising is 30 seconds and foaming is completed in 1 to 3 minutes. The foam can be handled in 15 minutes but keeping it in a mold for about 2 hours is recommended. Foam spray compositions are also available. The epoxy foams have excellent adhesion properties to various surfaces with which they are in contact while still liquid.

(4) Polyvinyl chloride resin rigid foams

Polyvinyl chloride (PVC) resins and copolymers are popular members of the plastics family. There are difficulties in their processing to foams, although their properties are desirable in rigid foams. There are two grades on the market of interest in rigid foam manufacturing. One of them is a vinyl dispersion resin containing about 5% of vinyl acetate as part of the copolymer with PVC. This resin is very rigid and plasticizers are used to obtain the required properties. The other resin is called Type I, low molecular weight resin and is essentially a low molecular polyvinyl chloride. The solvated gas process requires pressures of up to 300 atmospheres and application of a pressure vessel. This is not suitable for the instant process when low production cost is an aim. The gas releasing agent process has been possibilities. Gas evolving blowing agents are used, such as nitrogen compounds. The decomposition temperature is about 100° C. Compounding on a cold 2-roll rubber mill of the following composition yields a useful product: 100 weight parts of PVC dispersion grade resin (Geon 121), 70 weight parts of acetone, 10 weight parts of dibasic lead phosphite stabilizer, 25 weight parts of Nitrosan, which is a 70/30 mixture of N,N'-dimethyl-, N,N'-dinitrosoterephthalamide/white mineral oil. The density of 2 to 2½ p.c.f. can be achieved with this composition. The ingredients, less the acetone, are blended and the acetone is then added. The mixture is homogenized by one pass through the 2-roll mill. Metal molds heated 10 minutes with 100 p.s.i. steam are used and the molds are cooled. Heating the mixture for 15–20 minutes at 100° C. completes the foam expansion. The shell forming materials have to be properly selected to withstand these conditions, providing foam-in-place process is used. Other solvents can replace the acetone. Other blowing agents are also operative, like azobisisobutyronitrile, azoamides, nitroso compounds, etc. Crosslinked plasticizer modified PVC foams are produced by the aid of epoxidized oil (soya) as the plasticizer, which crosslinks upon heating. In this system pyromellitic dianhydride is recommended as the curing agent. This type of foam requires curing temperatures up to 163° C., (374° F.), which excludes it from many of the uses herein contemplated.

(5) Phenolic resin rigid foams

Phenolic foams are made from casting type phenolic resins containing between 1.2 and 3.0 mols of formaldehyde per mol of phenol. For foaming agents carbonate salts are used, such as sodium, potassium, ammonium, calcium, magnesium and other carbonates. The intermediate casting resins are commonly called resoles. Many of the carbonates have to be added just prior to foaming. Others may be incorporated into the resin, providing it is neutralized to a pH of 7 or higher. Acid catalyst is then used, which promotes the evolution of carbon dioxide. Metal powders may be used to generate hydrogen gas as the blowing agent. This presents the need for safety precautions. Oragnic gas generating agents are controlled with greater ease. Examples are: p,p'-oxybis(benzenesulfonylhydrazide), dinitroso pentamethylenetetramine and diazonium salts, such as benzene diazonium sulfate. Air has also been utilized as well as other agents, like hydrogen sulfide, halogenated hydrocarbons, etc. The acid curing resin foam is dried and cured after being foamed by the gas. Surface active agents are added to secure uniform cell structure. Alkyl aryl sulfates and sulfonates, alkylene oxide-phenol condensation products and lecithin are examples. The phenolic foams are usually brittle at low foam densities. With many types post curing is required, e.g. for 8 to 10 hours at 140 to 200° F. They can be foamed-in-place. They are less adaptable for the purposes of this invention than the rigid polyurethane foams, but with proper care of formulation and processing method, they can be used.

(6) Urea-formaldehyde rigid foams

Various methods have been used to produce urea-formaldehyde resin foams. The liquid resin is filled with air or gas under agitation, while in water solution, with surfactants and acid catalysts present. Gas can also be dissolved under pressure in the liquid resin. In one recent development low boiling liquids are emulsified in the liquid resin. The resin contains dibutyl phenyl-phenol sodium disulfonate as the emulsifier. Halocarbons or propane are emulsified into the solution under pressure at low temperatures. Upon addition of a catalyst, like phosphoric acid, the exothermic reaction volatilizes the emulsified liquid and causes foam formation. This type of foam is closed celled, whereas other foaming systems cause formation of open cells. The liquid blowing agents are used in proportions of 2 to 30% based upon the weight of the resin solids. Polyethylene glycols are added to increase the toughness of these otherwise brittle foams. When properly plasticized, these foams make useful products for the purposes of this invention. Low temperature curing resin formulations are preferred.

(7) Rigid silicone foams

The polymers forming the silicone foams are silicone oxygen compounds, like siloxanes. They are in the more expensive range and are used where good electrical insulating properties, low water absorption, good thermal stability are required. The polyorganosiloxanes can be powders or liquid. Foaming-in-place requires surface treatment of the cavity of the skins to secure adhesion. The foams can be coated with silicone elastomers for maximum temperature resistance. High temperatures are required to produce and set these foams, all equal to or above 300° F. and this reduces their usefulness in many of the applications herein contemplated. As hydrogen evolves in many cases, precautions for safety of the operation are required.

(8) Polyester rigid foams

It is difficult to foam polyesters by current techniques. The start of polymerization causes a stiff gel to form, which is not readily expanded by foaming agents. The polyesters are thermosetting partial polymers having high molecular weights compared with urethane prepolymers and epoxy resins. Even if the degree of polymerization is as low as 5%, the gel is non-thermoplastic and rigid and will not deform as the blowing agent vaporizes or releases gas. Polyesters containing residual hydroxy and carboxyl end groups react with diisocyanates and such hybrid polymers can be foamed by carbon dioxide evolution or by the incorporation of halocarbons. Surfactants, water and peroxides are present frequently in such foaming operations. Ways and means are being developed to foam polyesters. One method e.g., is using methacrylic acid polyesters exposed to ionizing radiation. Decomposition and polymerization set in simultaneously causing the polyester to foam.

(9) Miscellaneous rigid foams

Cellulose acetate foams were used in aircraft manufacture. The extrusion process is used utilizing a mixed liquid non-solvent (mixture of acetone and ethyl alcohol) at room temperature as the blowing agent and comminuted mineral of 100 to 325 mesh particle size as the nucleating agent. The solvent mixture dissolves cellulose acetate at a temperature exceeding 160° F. During the hot extrusion the solvent plasticizes and simultaneously foams the resin. Whereas with this method boards and rods can easily be manufactured, it is quite difficult to adapt cellulose acetate foams for the purposes of this invention.

Rigid acrylic foams are suitable for coarse celled applications, where maximum resistance to degradation by ultraviolet radiation is required. Alpha-chloroacrylic acid ester polymers may be polymerized at room temperature. The polymer decomposes upon heating to 150 to 180° C., to yield an alkyl-chloride foaming agent. The internally generated foaming agent produces foams of about 3 p.f.c.

The inclusion of dimethyl siloxane polymer surfactant for cell size control and addition of alcohol or paraffin oil to the monomer prior to polymerization provides finer cell diameters.

Asphalt foams can be prepared by releasing gases under pressure into this thermoplastic material in a manner similar to other foamed thermoplastics. In another method sodium bicarbonate is used as the blowing agent and aluminum stearate as a surfactant. By controlling the asphalt temperature carefully the gas release is obtained at a uniform rate and the gas is effectively entrapped. Special apparatus is available to heat the high melting asphalt and to inject gas or a blowing agent. The use of cold flow retarding agents is advantageous, like fillers, asbestos gelation agents and high melting resins.

Ebonite, which is hard rubber containing 30 to 40% sulfur can be expanded by foaming. Plastics, having high softening points require high pressure equipment to contain the blowing agent and the polymer mixture expands upon sudden release of pressure. Polypropylene, polyamides and polycarbonates can be foamed with variations of this method.

A special class of rigid foam is called syntactic foams. These depend for foam formation on hollow microspheres or "microballoons," and not on the resin used for bonding. Two types of microballoons are available. One is based upon a phenolic resin and the other one upon silica. The phenolic spheres have an average particle size diameter of 0.0017 inch and a particle size diameter range of 0.0002 to 0.005 inch. Bulk density is 3 to 5 p.c.f., true sphere density of 12 p.c.f. The spheres are filled with inert gas, such as nitrogen. Glass microballoons are being made under a license of Standard Oil Co. (Ohio). Microballoons are easily incorporated into liquid thermosetting plastics, like epoxies or polyesters. They form trowellable mixes and can be placed by hand to form sandwich structures. Room temperature curing polyesters and elastomers illustrate suitable binders. Densities of syntactic foams are not as low as with foamed-in-place systems, as high density resin fills the interstices. 20 to 25 p.c.f. are illustrative densities. In the instant process they could be used where the rigidifier foam is applied as a comparatively thin layer and does not fill the cavity of the molded shell fully. This limitation is primarily imposed by consideration of economy.

SELECTION OF THE INNER RIGIDIFIER COMPONENT

In selecting the rigid plastics foams, one has to consider the problems relating to the preparation of the articles of manufacture of this invention. The outer shell component is formed in a mold. During the foam producing operation in some cases the shell may be left in the original mold in which it was prepared. In other cases the shell is removed from the mold prior to the foam producing operation and the foam formation is carried out either in a second mold or without the aid of any mold, using the shell itself alone in shaping the inner rigidifier foam component. The setting of the rigid foam rigidifies the composite article of manufacture, and in order to remove it from the mold after the foam has solidified, providing a mold is used during this step, a multi-piece mold is required. Such molds are difficult to operate and require precision tooling. Therefore it is of great advantage if the inner rigidifier rigid plastics foam component can be prepared in the absence of any mold, using the shell component alone to shape it during its formation.

A further problem arises when the preparation of the foam or its application requires temperatures at which the shell component may deform. Additional problems relate to the shrinkage of the rigid foam under rigidifier after the foaming has been completed. It is of advantage if the outer surface of the inner rigidifier foam component remains in steady contact with the inner surface of the outer shell component during and after preparation of the end product. This requires controlled shrinkage properties.

Foams having no predetermined confinement are known as free rise foams. The volume expansion of free rise foams is limited only by the thermodynamics and reaction rate of the system. In producing foams in the interior of shells, as they are produced in the instant invention, the foam is always confined at least by the interior surface of the shell. In the instances where the cavity of the shell is fully filled by the foam, the foam is fully confined with the exception of the access opening (filling hole). In other instances an interior core or foam assists in the confinement. In still other cases the foam is confined by the interior of the shell on at least one surface and freely rises to fill the interior cavity. Any excess may force itself out of the access opening. In the cases of foam confinement, distention and distortion of pliable shells can result and, as a consequence, a reinforcing mold over the shell may be required during the foaming operation. Free rise on the interior surface does not extend a distending pressure on the shell. Thus, a reinforcing mold over the pliable shell is not necessary during the foaming operation. It can be seen that the absence of need for a second mold during the foaming operation is of great advantage. In cases where the foam is otherwise totally confined, it can be noted that after placement of the foaming composition the filling hole can be blocked to bring about a mild back-pressure that can assist in forcing the expanding foam to fill the interior spaces and undercuts.

To avoid excessive shrinkage of the inner rigidifier component during or after its preparation is of importance for the success of the products prepared hereunder. Quasi-prepolymer and prepolymer rigid polyurethane foam compositions are preferred, as they can be formulated with greater ease to produce low shrinkage. However, more recently, one-shot type rigid polyurethane formulations have also been formulated with low shrinkage properties. It has been found that efficient but slow mixing of the foaming components reduces shrinkage. This can be achieved by the so called folding action mixing, using an up and down and front to back motion, used for paint mixing. Machines are available to perform such mixing with efficiency and within the required short periods before foam rise starts.

Based on some of the above considerations, rigid polyurethane foams are eminently suitable for the purposes of this invention. They permit a room temperature initiated reaction. Means are available to reduce the heat of the exothermic reaction. The quasi-prepolymer systems permit uniformity of foam structure and require only primitive mixing equipment. Compositions suitable for foam-in-place type application are also available today from epoxy resin rigid foams. They are also suitable for spray application if properly compounded. Preheating of the compositions to 100 to 110° C. is required.

Polyvinyl chloride type rigid foams can be prepared by various methods. The gas releasing agent process can be carried out at temperatures around 100° C. and molds can be heated by steam of 100 p.s.i. pressure. Foam-in-place method is applicable and even rotational casting or slush casting is possible. Gelling and fusing the rigid foam requires temperatures which in turn require molds to prevent the deformation of the skin portion. Phenolic resin rigid foams can be prepared at room temperature and foam-in-place method is applicable. After-cure at 140–200° F. is advantageous and sometimes required. They are brittle by nature and may require plasticization. The urea-formaldehyde resin rigid foams can be prepared at room temperature and are also brittle, but can be plasticized. Polystyrene can be used from expandable beads. However, heat is required in the nature of 175 to 200° F. The beads are pre-heated to a temperature above the softening point of the polymer. Pre-expansion is advantageous and heat is applied for completing the foaming and fusing the outside walls of the beads together. Polystyrene is difficult to apply by the foam-in-place method. Silicone foams require 300° F. temperatures or more. Low density polyethylene can form foams of low densities, such as 2 p.c.f., illustrated by Ethafoam of Dow Chemical. It requires elevated temperatures in manufacturing and it is hard to use by the foam-in-place method. More recently room-temperature curing silicone foams have been formulated of two liquid components. They are blended and poured in place. The reaction is slightly exothermic but temperatures rarely exceed 150° F. It requires 10 hours or more for completion of the process. The list herein discussed is not a complete evaluation of all plastics rigid foams and their comparative values and disadvantages, but merely an illustration of how to evaluate for suitability.

The most preferred rigid plastics foam formers for the purposes of this invention are the rigid polyurethane foam compositions. The next preferred foam formers are the rigid epoxy resin foam compositions. Thermosetting foams are preferred over thermoplastic foams. Low curing temperatures and fast foam setting rates are of advantage. The setting rate should not be so fast as to prevent adequate distribution of the foaming composition throughout the inner surface of the outer shell component.

PREPARATION AND APPLICATION OF RIGID PLASTICS FOAMS

The preparation and application of rigid foams according to this invention will be illustrated with rigid polyurethane foams.

In one of the methods batch type equipment is used. Simple pails and sticks or propeller type agitators are used frequently to mix the required ingredients where low volume pours are required. In such cases quasi-prepolymer formulations are preferred as they permit proper control of the rise time. In this method formulations are used which delay the reaction to start not earlier than one half minute after the ingredients are mixed. The temperature of the prepolymer is usually between 70 and 100° F. The polyether polyol component is usually maintained at about 65 to 68° F. to prevent loss of the halocarbon blowing agent whose boiling point is around 75° F. The loss of blowing agent would result in higher density foams. The preferred p.c.f. does not exceed 3. In some cases foams with p.c.f.'s of up to 25 are useful. The ingredients are weighted out or proportioned by volume in separate clean containers. The cooled polyether polyol is added to the prepolymer. Mixing is completed in about 15 seconds. Mixing with turbine or disc type mixing blades at about 1000 r.p.m. for 15 to 25 seconds is illustrative. The mix is immediately poured after mixing and prior to the start of the foaming. The type of compounds supplied for batch mixing of two component systems rise to full height in 3 to 5 minutes. Most formulations are designed to provide a free rise of about 12 inches. Higher halocarbon concentrations are used for preparing thick sections.

Quasi-prepolymer two-package systems are marketed by various suppliers with varying qualities. As illustrations the Nopcofoam H–102N and Nopcofoam H–103N systems are mentioned, supplied by Nopco Chemical Company. The components are marked at T-component and R-component. The T-component is the quasi-prepolymer formed by the diisocyanate and a polyether polyol. It has reactive —NCO groups and supplies the isocyanate radicals for the foaming reaction. The T-component may also contain surface active agents, such as the silicones. The R-component contains the polyether polyols supplying additional OH-grouping for the foaming and polyurethane forming reaction. In this H-series the R-component contains the fluorocarbon blowing agent, the catalyst, such as N-ethyl morpholine and dibutyltin dilaurate and may also contain all or part of the surface active agents, such as the silicones. The suitable fluorocarbon is illustrated by Freon #11, which is trichlorofluoromethane, having a boiling point of about 74.7° F. The H-series of Nopcofoam compounds have a fast curing cycle. With formulation changes the curing speed and the p.c.f. of the resulting foam may be varied. The same applies to start of the rise and rise time of the foaming. Nopcofoam H–103N supplies a rigid foam of about 3 p.c.f. and H–102N supplies a rigid foam of about 2 p.c.f.

The foaming instructions are as follows for Nopcofoam H–102N: The temperature of both components should not be higher than about 70–75° F. The mixing ratio is about 52% R and 48% T, by weight. The R component is poured into the T component in the proper weight ratio. This is followed by mixing with a high speed drill motor, having a minimum r.p.m. of 1800, using proper mixing blades, such as an impeller type. Mixture becomes creamy white and volume increase is noticed in about 25 to 30 seconds. The shell, acting as a mold, may advantageously be preheated to 100 to 130° F. This is advantageous particularly where the foam has to fill areas of small cross-section. The higher the temperature the more rapid the foaming action. The foam cures at room temperature in about 24 hours.

The foaming instructions for Nopcofoam H–103N are similar to those of H–102N with regard to temperature, mixing, mixing time, and curing. However, the mixing proportions of the components are about 50% R-component and about 50% T-component, by weight. The average core density is 2.6 p.c.f.; the "K" Factor, Aged (B.t.u./hr./sq. ft./° F./in. thick) is 0.120; the maximum recommended service temperature is 180° F.

Preparation of carbon dioxide blown rigid foams is illustrated by first preparing a prepolymer in two steps. In the first step the following materials are added in the order shown to a clean and dry 12-liter uask; 240 weight parts of tolylene diisocyanate (80/20 mixture of 2,4/2,6 isomers) and 100 weight part of Pluracol TP 440 Triol, urethane grade with hydroxyl number of 400. The Pluracols are polyoxypropylene derivatives of trimethylolpropane, supplied by Wyandotte Chemicals Corporation. They are available with varying molecular weights and they are characterized by their hydroxyl number. The one used herein has a viscosity of 625 cps. at 25° C. and an approximate molecular weight of 418. As the above materials are mixed, the temperature rises due to an exothermic reaction. After the temperature rise subsides, the temperature is adjusted to 100° C. and the mixture is held for 1 hour. In the second step the mixture is cooled to 60° C. and transferred to a clean and dry container for storage. The NCO/OH ratio of the product is 3.85/1.0. After aging for 24 hours the viscosity of this prepolymer at 25° C. is 4000 cps.±1000 cps. and it has a free —NCO content of 25%±0.4%. For the Foam Preparation the following ingredients are first premixed:

|  | For product— | |
| --- | --- | --- |
|  | I | II |
| Component A: | | |
| Above prepolymer (25% free —NCO) | 100 | 100 |
| Silicone oil L-520 | 0.5 | 0.5 |
| Component B: | | |
| Diethylethanolamine | 1.0 | 1.0 |
| Water | 2.5 | 1.5 |
| Pluracol TP 440 | 25.0 | 30.5 |
| Quadrol polyol | 6.5 | 10.0 |

The Silicone Oil L–520 is supplied by Union Carbide Chemical Company, Silicone Division. Quadrol is N,N, N',N'-tetrakis (2 - hydroxypropyl)ethylenediamine, supplied by Wyandotte. The silicone oil can be added to Component B, in part or in full, if desired. Components A and B are mixed together rapidly and poured into the shells, acting as molds. The shells may be supported by molds themselves. The quantity recommended for mixing at one time is 300 to 400 grams, depending on the foam density. The foam is allowed to rise and become tack-free within 10 minutes. This type of foam is recommended to be cured for about 2 hours at 70° C. By proper selection of faster catalysts the curing temperature can be reduced even to room temperature. The core density for Product I is 1.8 p.c.f. and for Product II it is 2.8 p.c.f. The compresive strength at yield point in p.s.i. is 27.6 for Product I and 49.0 for Product II.

The use of prepolymers can be illustrated by sprayable rigid urethane foam systems. The foaming system consists of two fluid intermediates which are mixed immediately before application to the target surface. The intermediates are (a) a liquid prepolymer, prepared by reacting a polyol with an organic diisocyanate and (b) a liquid catalyst which contains (1) a volatile blowing agent and (2) a curing agent for the foam. Component (a) is placed in a pressure tank. A heat exchanger in the delivery line warms the prepolymer to 130° F. Component (b) is thoroughly mixed and placed in a second presure tank. A heat exchanger may also be used in this line to regulate its discharge temperature. In a specially constructed spray gun, components are mixed externally in the spray pattern after the materials leave the gun, but before they reach the surface to be foam coated. The material begins foaming almost immediately on the target surface, and rises to full foam height in about 1 minute. The foam may be initially friable, but after curing, e.g. at 130° F. the friability disappears in 10–15 minutes. Pluracol TP 440 and Quadrol permit the formulation of this type of composition. Foam densities of from about 2½ to about 3 p.c.f. are practical. Proper formulation provides for elimination of sagging on vertical surfaces. The elevated temperature of the prepolymer also promotes prevention of sagging.

In case of large scale production and where equipment cost permits it, one-shot application is of advantage. Polymethylene polyphenylisocyanate, supplied under the Trademark of PAPI by the Upjohn Company, Polymer Chemicals Division, is suitable to illustrate successful one-shot application for the pour-in-place or foam-in-place method of foam preparation. PAPI yields low exotherm one-shot systems practical for conventional pour molding or spraying. It gives good early strength that allows quick handling of the end products. It has superior dimensional stability. Polyols suitable for use with PAPI include methyglucoside, sorbitol, sucrose, amine-derived cross-linking agents, phosphorus-derived resins and polyesters. Suitable catalysts include tetramethylguanidine, trimethyl piperazine, dimethylethanolamine, triethylamine, dibutyltin dilaurate, stannous octoate, dibutyltin diacetate, amongst others. Suitable silicone co-polymers are Dow Corning Corporation's DC–201, Union Carbide's L–520 and L–530 and General Electric's XF–1066. As blowing agents fluorocarbon 11 (F–11) and inhibited F–11, i.e. F–11B are suitable for illustrative purposes. Other fluorocarbons may also be used. Table 1 shows a few illustrative examples of PAPI based one-shot rigid urethane foams. Parts are by weight.

TABLE 1

| Ingredient | High rise, self extinguishing | Packed, non-self extinguishing |
|---|---|---|
| Methyl glucoside polyol, OH-No. 440 | 82.0 | 100.0 |
| Fyrol 6, O,O-diethyl-n,n-bis(2-hydroxy-ethyl)aminomethylphosphonate | 18.0 | |
| Silicone, DC–201 | 1.5 | 1.5 |
| Tetramethylguanidine | 0.7 | |
| Dimethylethanolamine | | 3.0–3.5 |
| Fluorocarbon 11B | 38.0 | 41.0 |
| PAPI (NCO/OH=1.05/1) | 110.0 | 109.0 |
| Processing: | | |
| Resin component temp.,° F | 110 | 105 |
| PAPI component temp.,° F | 110 | 115 |
| Molding temperature,° F | 110 | 115 |
| Overall density, p.c.f. | 2.45 | 2.0 |

Formulation for non-self-extinguishing foam suitable for spray application is given in Table 2.

TABLE 2

| | Weight parts |
|---|---|
| PAPI | 110.00 |
| Polyfunctional polyglycol Hydroxy No. 450 | 100.00 |
| Silicone DC–201 | 2.00 |
| Fluorocarbon 11B | 40.00 |
| Tetramethylguanidine | 2.00 |
| DABCO (Triethylenediamine) | 1.50 |
| Dibutyltin diacetate | 0.30 |
| Processing data: | |
| NCO ratio | 1.05 |
| Resin stream temperature, ° F. | 75 |
| PAPI stream temperature, ° F. | 75 |
| Throughput, lbs./minute | 5.50 |
| Cream time, seconds | 3 to 4 |
| Rise time, seconds | 7 |
| Tack free time, seconds | 7 |
| Core density, p.c.f. | 2 |
| Closed cells, percent + | 90 |

As has been demonstrated, rigid polyurethane foam layers can be prepared according to this invention by either one of the major known methods: (1) quasi-prepolymer method, (2) prepolymer method and (3) the one-shot method. The quasi-prepolymer method is preferred. The application by poured-in-place or foamed-in-place method is satisfactory. Spray application is usable. Slush casting or rotational casting may be used in many instances.

The products of this invention require special care in many respects. Foaming and curing at temperatures where the molded skins do not deform have an advantage and permit the elimination of the use of an outside mold during foaming. It increases ease and economy of production if foam-in-place filling of shells can be accomplished while the filling hole of the mold remains open to the atmosphere. Conversely, the closing of molds and introducing pressures above 15 lbs. per square inch becomes more difficult and less attractive.

With regard to shrinkage, no problem arises after curing if the inner layer foam shrinks at the same rate as the shell. If the foam shrinks in a different degree and particularly if it shrinks more than the shell after the molding operation is completed, an unacceptable product may be obtained. Therefore, preventive methods of manufacture are warranted to block excessive shrinkage of the foam and formulation is adapted to avoid excessive shrinkage. During the period that the foam rises pressure is exercised by the foam. To prevent deformation of the molded skin caused by such excessive pressure is also important. In some cases the shells are backed up by a mold during the foaming operation to prevent such deformation. Proper formulation of the foaming compositions can contribute greatly to the solution of these problems. However, in many instances manufacturing steps or mechanical means are used to overcome possible difficulties. Some of these are discussed below in connection with the drawings.

Whereas in most cases the rigid foam snugly attaches itself to the molded shell, in some cases it is of advantage to apply an adhesive layer between the shell and foam to overcome possible effects of excessive shrinkage. A great variety of adhesives may be used. Hot asphalt or other hot adhesives are illustrative. Suitable adhesive types are further illustrated by resorcinol adhesives, rubber emulsions, rubber solutions, epoxy resins, polyester resins, latex, latex modified cements, amongst others. The adhesive causes the shell either to shrink with the foam or, providing the shell is strong enough, the adhesive causes the foam to adhere to the surface of the shell and prevents the former from shrinking away from the surface.

A special type of foaming is known in the art as "frothing." It is applied by mixing machines, using FREON 12 ($CCl_2F$) as blowing agent. Because of the low boiling point of this blowing agent, it is applied by a third line leading from a cooled pressure tank to the mixing head of the machine. A part of the foaming occurs in the mixture head and the rest in the piece or mold The percentual distribution between foaming in the head and in the piece can be regulated by formulation. A 50:50 percentual proportion is illustrative. "Frothing" falls under the terms of "pour-in-place" and "in situ" foaming. It is characterized by lower foam rise and development of a lesser pressure during the foaming-in-place operation. As a consequence, it causes less distortion of the shell component. Frothing is harder to control than other conventional foaming. It may simultaneously develop small and large cells, thereby causing some uneven material. The method is more adaptable to form larger objects with large foam volumes. The difficulty of starting and stopping this type of operation, with equipment available at the present, more or less excludes it from the useful range of making small objects. Frothing can yield lower rigid foam densities than attainable by other methods.

After reviewing some of the considerations further above it is apparent that the absence of need for a second mold during foaming is of great advantage. Some of the advantages may be summarized as follows: (1) Ease of production of the composite articles of manufacture; (2) possibility of producing composite articles of manufacture with complicated undercuts which could not be removed from a one-piece or multi-piece second mold with the required ease; and (3) savings of the required labor and mold cost. According to this invention many factors may assist to eliminate the need for a reinforcing mold during the foaming step. One factor is the proper and correct formulation of the foaming composition to achieve radical lowering of the foaming pressure. The pressures of foams in rising can vary considerably. If excessive pressure develops, distention and distortion of the premolded shell component may occur. Proper formulation achieves minimal shrinkage, minimal pressure development during foaming and low polymerization temperatures. With such a composition the foaming-in-place operation can be carried out with ease without the application of a reinforcing mold during the foaming operation. Another factor is to increase the resistance of the shells to distorting pressure by, for example, increasing the wall thickness of the shells or utilizing more rigid types of plastisol, such as those containing reactive acrylic monomers. The latter type yields shells which are still thermoplastic and pliable, but their deformation temperature is raised to a range of from about 138° F. to about 150° F. As they are considerably more rigid at room temperature than other more conventional plastisols, they have a greater resistance to foam pressures without showing distortion. Still another factor is the size of the access opening. In many instances where the shape and planned use of the composite article of manufacture permits the increase of the relative size of the access opening, such increase reduces the foaming pressure and permits the elimination of the second or reinforcing mold during the foaming step.

Generally speaking requirement for a second reinforcing mold during the foam-in-place operation exists where the composite article of manufacture is large in size, (like when it exceeds in one dimension 1 or 2 feet), or has numerous flat surfaces. Even in cases of large shells and shells that are particularly pliable, due to formulation or comparatively thin wall thickness, I have found it possible to avoid the need for a second mold by slush casting or rotational casting of incremental layers of rigid polyurethane foam against the interior shell surface. By applying several layers of comparatively thin coats of foam in succession a thick enough rigidifier component can be produced to meet the requirements. No excessive pressure builds up and as a consequence distortion is avoided. A similar effect can be obtained by placing a core in the interior of the shell cavity and foaming-in-place between the core and the interior surface of the shell. The core may be of a plastics skin or paper-clipboard, amongst others. The pressures exerted are lowered in this case by the reduced volume and thickness of the foam wall between the shell and the core. In a related embodiment incremental horizontal successive filling of foam layers is applied and as a result the distorting or distending pressure of the foam on the shell is reduced to a degree eliminating the need for a reinforcing mold during foam application.

ANCILLARY REINFORCING ELEMENT (SPINE)

When the outer shell component and the inner rigidifier component jointly form a cavity the presence of an ancillary reinforcing element may be useful and desirable. Its utility occurs when the composite article of manufacture is exposed to strong stresses and pressures. Such an ancillary reinforcing element assists the rigidifying action of the inner component and toughens the composite article of manufacture. In my prior applications this element was called reinforcing spine. This ancillary reinforcing element may be of metal, paper-clipboard, cardboard or a synthetic resin layer, amongst other suitable materials. The element may be continuous or discontinuous. When it is continuous, it may be applied by casting, such as slush casting or rotational casting. Low melting point metal alloys, used as ancillary reinforcing elements, may be applied by casting. The same applies to the suitable synthetic resin compositions, illustrated by polyester resins and essentially flexible epoxy resins. In many instances, metals with a melting point of around 700° F. may be successfully cast into cavities formed jointly by outer and inner components. This can be explained by the cooling action of the system forming the joint cavity on the cast thin metal layer required.

The epoxy resins and polyester resins coat the entire interior surface of the joint cavity and are advantageously applied by casting. They improve to a great extent the resistance of the composite articles of manufacture to the following stresses: impact, flexing, compression and tension. A few illustrative examples of suitable compositions to form such ancillary reinforcing elements (A-R-E) from synthetic resins are given below: (Percentages are by weight.)

Example A-R-E No. 1.—12.4% of Laminac Polyester Resin #4128, 37.2% of Laminac Polyester Resin EPX–126–3, 0.1% Cobalt Naphthenate with 6% metal content, 49.3% Flint (silica) 325 mesh grade and 1% of MEK peroxide, totaling 100%. This composition can be slush cast at room temperature and it sets in about 10 to 15 minutes. By reducing the quantity of cobalt and MEK peroxide the setting time can be extended.

Example A-R-E No. 2.—Example A-R-E No. 1 is repeated with the change that the resin component is entirely 49.6% of Laminac Polyester Resin EPX–126–3, the other ingredients remaining unchanged. This composition produces a more flexible resin layer than the preceding example and is preferred. Some of the ingredients are described in greater detail under the Shell Components under Example D.

Flexible epoxy resin compositions for the use of ancillary reinforcing elements are preferred to the polyester compositions. The epoxy compositions can be applied by slush casting and they set overnight at room temperature to a sufficient degree so that the articles can be handled. Complete polymerization is achieved in an additional few days. The epoxy layers are very tough.

Example A-R-E No. 3.—A flexible epoxy resin composition is made of the following ingredients: 15.05% EPON Resin 871, 15.05% EPON Resin 828, 6.15% Epoxide #7 (an epoxy plasticizer of Procter & Gamble), 30.2% of 325 mesh grade Silica, 30.2% of 60 mesh grade Silica, 3.0% Dimethylenetriamine (DTA) and 0.35% Cab-O-Sil, totaling 100%. Some of the ingredients are described in greater detail in Example C. of the shell component. The Cab-O-Sil regulates viscosity, flow and stoppage of flow.

An illustration of desirable thickness for the resinous ancillary reinforcing elements is from about 15½ mils to about 250 mils. Many of the resinous compositions can be applied by spraying.

In the drawings:

FIG. 2 is a vertical cross-sectional view of the mold of FIG. 1. Shell 14 is molded in mold 13.

FIG. 3 is a vertical cross-sectional view of the mold 13 of FIG. 1, illustrating the removal of the plastisol shell 14 from the mold. The shell is in a somewhat collapsed and distorted state at the removal temperature, but regains its original molded shape after removal and cooling to room temperature.

FIG. 4 shows the plastisol shell 14 after removal from the metal mold 13 according to FIG. 3. Rigid foam 15 fills out the cavity of the molded shell 14. The shell is protected during the foaming operation by a plaster of paris mold 16 which has been applied to the molded shell e.g., by dipping, prior to foaming. For this purpose the shell is dipped in a liquid plaster mixture, providing contact between the outside surface of the shell and the plaster mixture. The plaster mixture is allowed to solidify. The foaming composition is then placed into the cavity of the shell and allowed to foam-in-place.

FIG. 5 shows the vertical cross-sectional view of the composite article of manufacture of FIG. 4, with the shell 14 and the rigid foam 15, after the plaster of paris mold of FIG. 4 has been removed by cracking and peeling.

Figure 1:
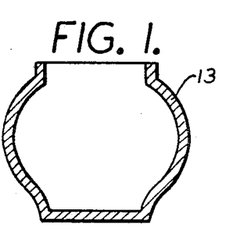
FIG. 1 is a vertical cross-sectional view of a single piece mold utilized in the present invention to prepare the shell portion. 13 is the metal mold and it shows an undercut.
Figures 2, 3, 5, 6, 8, 9, 10, 12A, 12B:
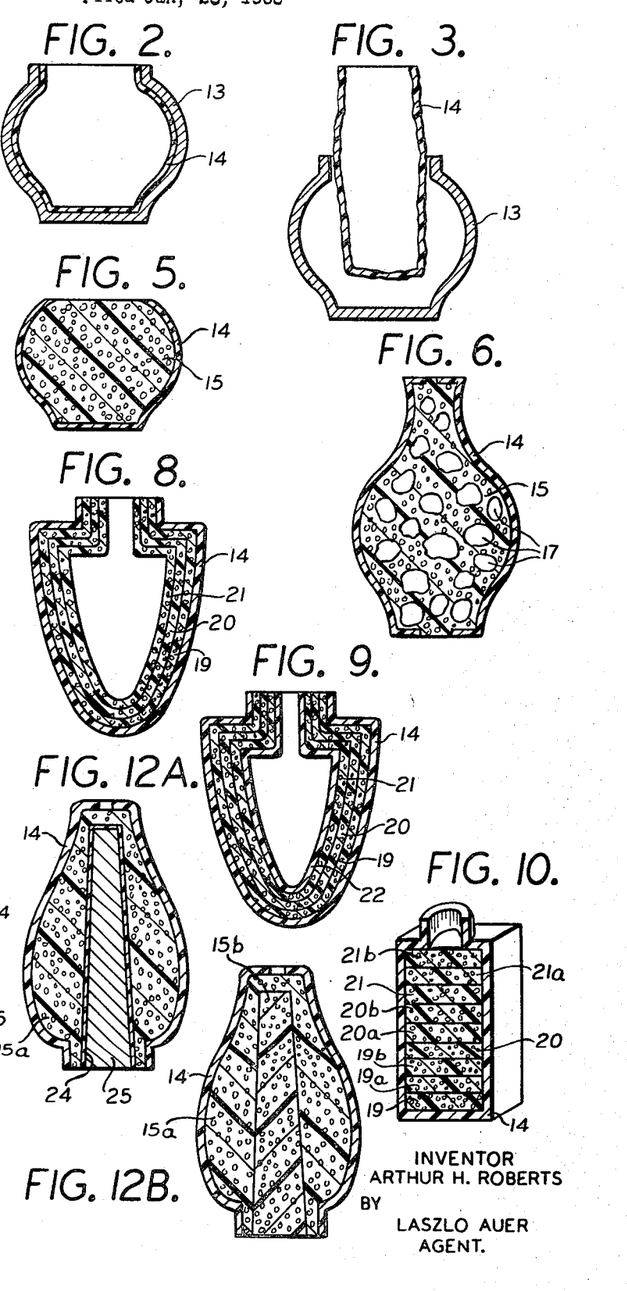
Figure 4:
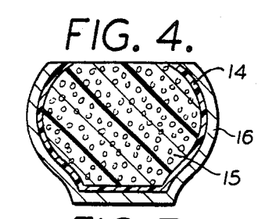
Figure 7:
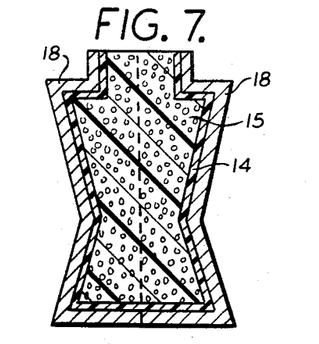
Figure 11:
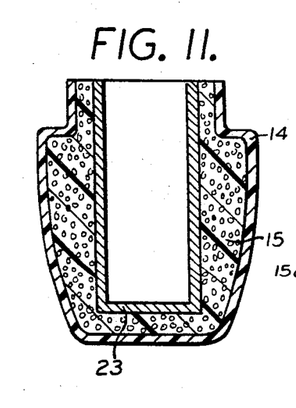

It may be noted, that in FIG. 4 low temperature melting metal alloys, such as manufactured by the Cerro Corporation, can be sprayed on the shells, to replace the plaster of paris layer. After the rigid foam composition solidifies and cures in the cavity of the shell the metal can be melted off at low temperatures and recovered. This alternative requires proper correlation between the melting point of the low temperature melting metal alloy and the maximum temperature to which the shell material can be exposed to without permanent damage.

FIG. 6 is identical with FIG. 5 of the copending parent application Ser. No. 22,002 referred to above and illustrates the vertical cross-sectional view of an article manufactured according to this invention. 14 is the molded plastisol shell. 15 is a rigid polyurethane foam inner rigidifier component which fills out the cavity of the molded plastisol shell. 17 illustrates "weights" which are suspended in the rigid polyurethane foam. They serve to reduce the quantity of the required polyurethane foam, reduce shrinkage and may also increase the weight of the composite article of manufacture. The inexpensive scrap weights are selected from products having suitable density and may be illustrated by wood scrap, such as wood ends from boards cut into cubes, or cardboard objects of various shapes. These scrap pieces are placed into the cavity of the molded shell prior to solidification of the rigid foam either prior to pouring of the foam composition or shortly thereafter. They may also be premixed with the foam composition or one of its components. A uniform distribution of these weights in the foam composition is desirable. This goal can be achieved with ease.

FIG. 7 illustrates a vertical cross-sectional view of a composite article of manufacture of this invention at the manufacturing stage. 18 illustrates a two-piece mold in which the plastisol shell 14 is molded. 15 is the rigid polyurethane foam. The shell is kept in place in the mold while the composition forming the rigid polyurethane foam is poured-in-place and foamed-in-place in the molded shell. The composite article of manufacture is removed from the mold only after the manufacturing is fully completed and the foam is cured. For removal, the two-piece mold is taken apart. To facilitate removal, the mold surface may contain a mold release lubricant, or air pressure may be applied between mold surface and shell.

FIG. 8 illustrates a vertical cross-sectional view of a composite article of manufacture of this invention. 14 is the molded outer shell component. 19, 20 and 21 illustrate three individual layers of rigid polyurethane foam, applied and formed in succession. To secure even distribution they are poured-in-place in subsequent increments, each one coating the inner surface of the available inner cavity while the shell is being rotated and the foam forming composition is still liquid. 19 coats the inner surface of the shell. 20 coats the inner surface of 19 and 21 coats the inner surface of 20. In some cases it is advantageous to complete the distribution of the foam forming composition on the interior surface of the cavity prior to commencement of the foaming. The individual layers of the solid polyurethane foam have good adhesion to each other. The embodiment illustrated by FIG. 8 reduces the quantity of polyurethane foam utilized, reduces shrinkage and, by reducing the pressure during the foam expansion, eliminates the need for an outside mold during the foaming operation in the majority of the cases. In one embodiment of this invention, as illustrated by FIG. 8, 19 is a foam of about 20 to 25 p.c.f. and 20 and 21 are of a foam of about 2 to 3 p.c.f. The high density foam performs the main task of rigidification and prevents distortion during the second and third foaming step without the use of a mold during foaming. In another embodiment all three layers of 19, 20 and 21 are of a foam of about 1½ to 3 p.c.f. In FIG. 8 the outer shell component and the inner rigidifier component jointly form a cavity.

FIG. 9 is an alternative form of FIG. 8. The additional feature is 22, illustrating an ancillary reinforcing element on the interior surface of the cavity formed jointly by the outer shell component and the three layers of the inner rigidifying component. In this instance the ancillary reinforcing element is advantageously either a flexible epoxy resin composition or a flexible polyester composition. They can be applied by slush casting or rotational casting or by spray application. They are of a composition which cures either at room temperature or at low elevated temperatures.

FIG. 10 is a front view of a three-dimensional illustration of a composite article of manufacture of this invention, having both vertical and horizontal rectangular cross-sections. This type of object has a greater tendency to push outward during foaming as a consequence of the foam rise. 19, 19–a, 19–b, 20, 20–a, 20–b, 21, 21–a and 21–b illustrate 9 individual layers of rigid polyurethane foam, prepared as described in connection with FIG. 8 in successive foaming steps. This "layer method" eliminates the excessive pressure during foaming and simultaneously may eliminate the need for an outer protective mold during the foaming.

FIG. 11 is a vertical cross-sectional view of a composite article of manufacture according to this invention. 14 is the molded shell. 23 is a tube placed into the internal cavity of the molded shell. This tube can be made e.g. of thin aluminum metal, or of chipboard paper or the like. The rigid polyurethane foam 15 is formed around the tubing. The effect is to reduce the inward shrinkage of the foam layer and also to reduce the quantity of polyurethane foam used.

FIG. 12–A and FIG. 12–B illustrate alternatives. They are vertical cross-sectional views of related and alternative composite articles of manufacture of this invention. 14 is a molded plastisol shell. 24 is a thin layer of molded plastics skin protruding into the internal cavity of the molded shell 14. During the foaming operation this thin layer of 24 can be supported by a plug 25 which is then withdrawn after the foaming operation is completed. 15–a is a rigid polyurethane foam which has been prepared by foaming around the plastic coated plug. The foam 15–a fills out the space between the said plastics coated plug and the molded outer shell component. After the foaming producing 15–a is completed, according to the alternative illustrated by FIG. 12–A, the plug is removed, leaving the thin layer of plastics skin 24 as a coating on the interior of the cavity of the foam layer 15–a. This illustrates the utility for insulated containers, like thermos bottles. In another alternative, illustrated by FIG. 12–B, both the plastics skin 24 and the plug 25 of FIG. 12–A are withdrawn and the space obtained by such withdrawal is filled with a second quantity of rigid polyurethane foam 15–b. This second quantity of foam 15–b is supported by the outer foam layer of 15–a during the foaming operation. In this last mentioned embodiment, illustrated by FIG. 12–B, 15–a may be of a rigid higher density polyurethane foam with p.c.f. values of from about 20 to about 25, whereas 15–b may have a p.c.f. value of from about 1½ to about 3. The high density foam performs the main task of rigidification and prevents distortion in the second foaming step without the use of a mold.

The drawings illustrate some aspects of this invention and do not limit the scope of the invention herein claimed.

I claim:

1. A rigid composite decorative article of manufacture comprising a hollow outer shell component and an inner rigidifier component, said outer shell component being a premolded pliable plastic material having an access opening and which, when free of the rigidifier component, is itself at least temporarily deformable by hand pressure at room temperature, the inner rigidifier component being a rigid cellular plastic material positioned within the space enclosed by the outer shell component, said rigidifier component being formed integrally with the shell component over the entire inner surface of the latter, said composite article of manufacture being resistant to impact.

2. The composite article of manufacture of claim 1, wherein the rigidifier component is a thermosetting rigid plastic foam.

3. The composite article of manufacture of claim 1, wherein the rigidifier component formed within the cavity of the hollow outer shell component is a thermoset rigid plastic foam having a closed cell structure, and wherein the outer shell component is thermoplastic.

4. The composite article of manufacture of claim 1, wherein the outer shell component is thermoplastic and has a wall thickness of from about 15½ mils to about 250 mils, and wherein the rigidifier component is a rigid polyurethane foam.

5. The composite article of manufacture of claim 1, wherein the rigidifier component fills the cavity of the hollow outer shell component in its entirety and wherein said rigidifier component being a rigid polyurethane foam material having the characteristic of being in itself deformable on impact.

6. The composite article of manufacture of claim 1, wherein the access opening of the outer shell component has an area not exceeding one sixth of the outer surface area of said shell component, wherein the outer shell component comprises vinyl chloride in a polymerized and plasticized state, and wherein the rigidifier component is formed within the cavity of the hollow outer shell component.

7. The composite article of manufacture of claim 1, wherein the horizontal parallel cross-sections of the article taken at different positions show varying measurements and shapes, indicating undercuts and curved surfaces.

8. The composite article of manufacture of claim 1, wherein the outer shell components has a wall thickness of from about 15½ mils to about 250 mils.

9. The composite article of manufacture of claim 1, wherein the outer shell component comprises a plasticized polyvinyl chloride.

10. The composite article of manufacture of claim 1, wherein the outer shell component comprises a copolymer of vinyl chloride in a plasticized state.

11. The composite article of manufacture of claim 1, wherein the outer shell component comprises ethylene in a polymerized state.

12. The composite article of manufacture of claim 1, wherein a layer of adhesive is present between the outer shell component and the inner rigidifier component in order to promote the intimate adhesion of the inner surface of the shell component to the outer surface of the rigidifier component.

13. A rigid composite decorative article of manufacture comprising a hollow outer shell component and an inner rigidifier component, said outer shell component being a premolded pliable plastic material having an access opening and which, when free of the rigidifier component, is itself at least temporarily deformable by hand pressure, the inner rigidifier component being a rigid cellular plastic material positioned within the space enclosed by the outer shell component, said rigidifier component being formed integrally with the shell component over the entire inner surface of the latter, said composite article of manufacture being resistant to impact, and wherein the said rigidifier component and outer shell component jointly form a cavity.

14. The composite article of manufacture of claim 13, wherein said article of manufacture having an ancillary reinforcing element in at least a single local position, said element being in intimate contact with the inner surface of the rigidifier component.

15. The composite article of manufacture of claim 13, wherein the inner surface of said cavity being in intimate adhesive contact with a resinous reinforcing layer which is a member of the class consisting of flexible epoxy resins and flexible polyester resins.

References Cited

UNITED STATES PATENTS

| | | |
|---|---|---|
| 2,794,756 | 6/1957 | Leverneuz. |
| 2,855,021 | 10/1958 | Hoppe 156—79 XR |
| 2,865,800 | 12/1958 | Stastny 161—233 XR |
| 2,927,876 | 3/1960 | Hoppe et al. 161—159 XR |
| 2,950,505 | 8/1960 | Frank 264—302 |
| 2,977,639 | 4/1961 | Barkhuff et al. 161—159 XR |
| 3,032,224 | 5/1962 | Lou 215—13 |
| 3,041,220 | 6/1962 | Martin et al. 156—79 XR |
| 3,042,137 | 7/1962 | Mathues et al. 156—77 XR |
| 3,147,975 | 9/1964 | Gruss et al. 273—82 |

FOREIGN PATENTS

| | | |
|---|---|---|
| 670,275 | 3/1949 | Great Britain. |
| 218,027 | 10/1958 | Australia. |

ROBERT F. BURNETT, *Primary Examiner.*

W. A. POWELL, *Assistant Examiner.*

U.S. Cl. X.R.

156—78, 245; 161—116, 138, 160, 161, 183, 184, 190, 227, 231, 257, 413; 264—45, 250, 255, 302